United States Patent
Ha et al.

(10) Patent No.: US 9,311,220 B1
(45) Date of Patent: Apr. 12, 2016

(54) SYSTEM TO UNCOVER ROOT CAUSE OF NON-DETERMINISTIC (FLAKY) TESTS

(71) Applicant: GOOGLE INC., Mountain View, CA (US)

(72) Inventors: Jungwoo Ha, Los Altos, CA (US); Jaeheon Yi, San Francisco, CA (US); Peter Dinges, Urbana, IL (US); Jeremy Manson, Mountain View, CA (US); Caitlin Harrison Sadowski, San Francisco, CA (US); Na Meng, Austin, TX (US)

(73) Assignee: GOOGLE INC., Mountain View, CA (US)

( * ) Notice: Subject to any disclaimer, the term of this patent is extended or adjusted under 35 U.S.C. 154(b) by 45 days.

(21) Appl. No.: 14/145,233

(22) Filed: Dec. 31, 2013

(51) Int. Cl.
    *G06F 11/07* (2006.01)
    *G06F 11/36* (2006.01)

(52) U.S. Cl.
    CPC .......... *G06F 11/3636* (2013.01); *G06F 11/079* (2013.01); *G06F 11/362* (2013.01); *G06F 11/366* (2013.01)

(58) Field of Classification Search
    CPC ............ G06F 11/3664; G06F 11/3688; G06F 11/0751; G06F 11/3636; G06F 11/3668; G06F 11/362; G06F 11/366; G06F 11/079
    See application file for complete search history.

(56) References Cited

U.S. PATENT DOCUMENTS

| | | | |
|---|---|---|---|
| 6,658,652 B1 * | 12/2003 | Alexander, III ....... | G06F 11/366 707/999.202 |
| 2001/0020293 A1 * | 9/2001 | Uchihira ............... | G06F 11/362 717/128 |
| 2004/0049565 A1 * | 3/2004 | Keller ................... | G06F 11/079 79/223 |
| 2004/0267487 A1 * | 12/2004 | Brown .................... | H04L 43/50 702/120 |
| 2009/0210837 A1 * | 8/2009 | Craig .................. | G06F 17/5022 716/106 |
| 2012/0096441 A1 * | 4/2012 | Law .................... | G06F 11/3644 717/127 |
| 2012/0311543 A1 * | 12/2012 | Alexander, III ......... | G06F 8/443 717/128 |

OTHER PUBLICATIONS

Anders Bjorkelund and Joakim Nivre, non-Deterministic Oracles for Unrestricted Non-Projective Transition-Based Dependency Parsing, Jul. 2015, retrieved online on Nov. 23, 2015, pp. 76-86. Retrieved from the Internet: <URL: https://aclweb.org/anthology/W/W15/W15-2210.pdf?>.*

(Continued)

*Primary Examiner* — Thuy Dao
*Assistant Examiner* — Hanh T Bui
(74) *Attorney, Agent, or Firm* — Birch, Stewart, Kolasch & Birch, LLP

(57) ABSTRACT

A system and method are disclosed for determining the root cause of non-deterministic tests. An exemplary system may receive a non-deterministic test and run the non-deterministic test with call trace collection enabled. For each trace, the system may determine whether the trace was associated with a passing or failing test. Each trace may be labeled according to the trace's association. Then, dynamic call trees may be constructed, one for the traces associated with passing tests and one for traces associated with failing tests. The dynamic call trees may be compared to determine subtree patterns that occur in one tree, but not the other. The subtree patterns may then be ranked based on the number of times the subtrees occur in the traces in order to determine the root cause of the non-deterministic test.

12 Claims, 7 Drawing Sheets

(56) References Cited

OTHER PUBLICATIONS

Charles E. Leiserson et al., Deterministic Parallel Random-Number Generation for Dynamic-Multithreading Platforms, 2012, ACM, retrieved online on Nov. 23, 2015, pp. 1-12. Retrieved from the Internet: <URL: http://delivery.acm.org/10.1145/2150000/2145841/p193-leiserson.pdf?>.*

* cited by examiner

```
@Test
public void test() {
    when(task.shouldRun())
        .thenReturn(true);
    scheduler.schedule(task);
    scheduler.run();
    verify(task).run();
}
```

FIG. 2

Call tree of Successful Execution

Call tree of Failing Execution

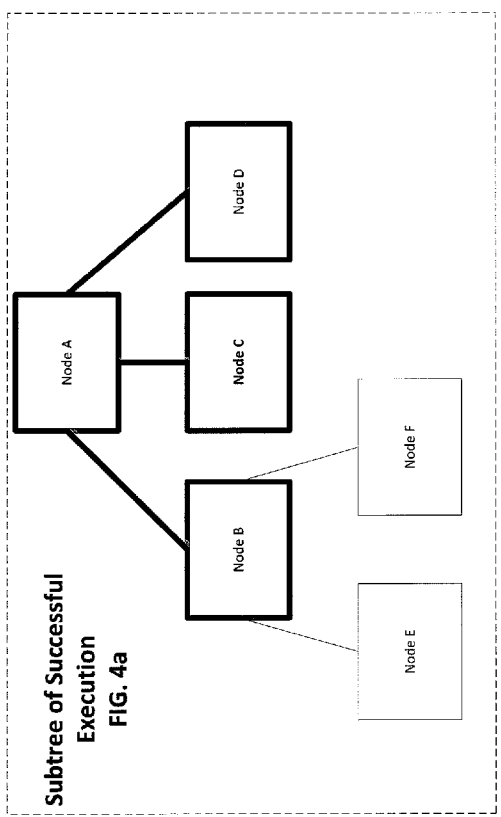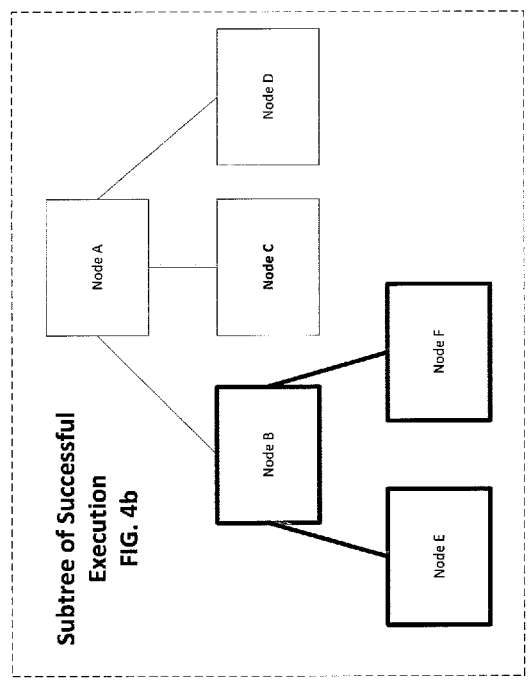

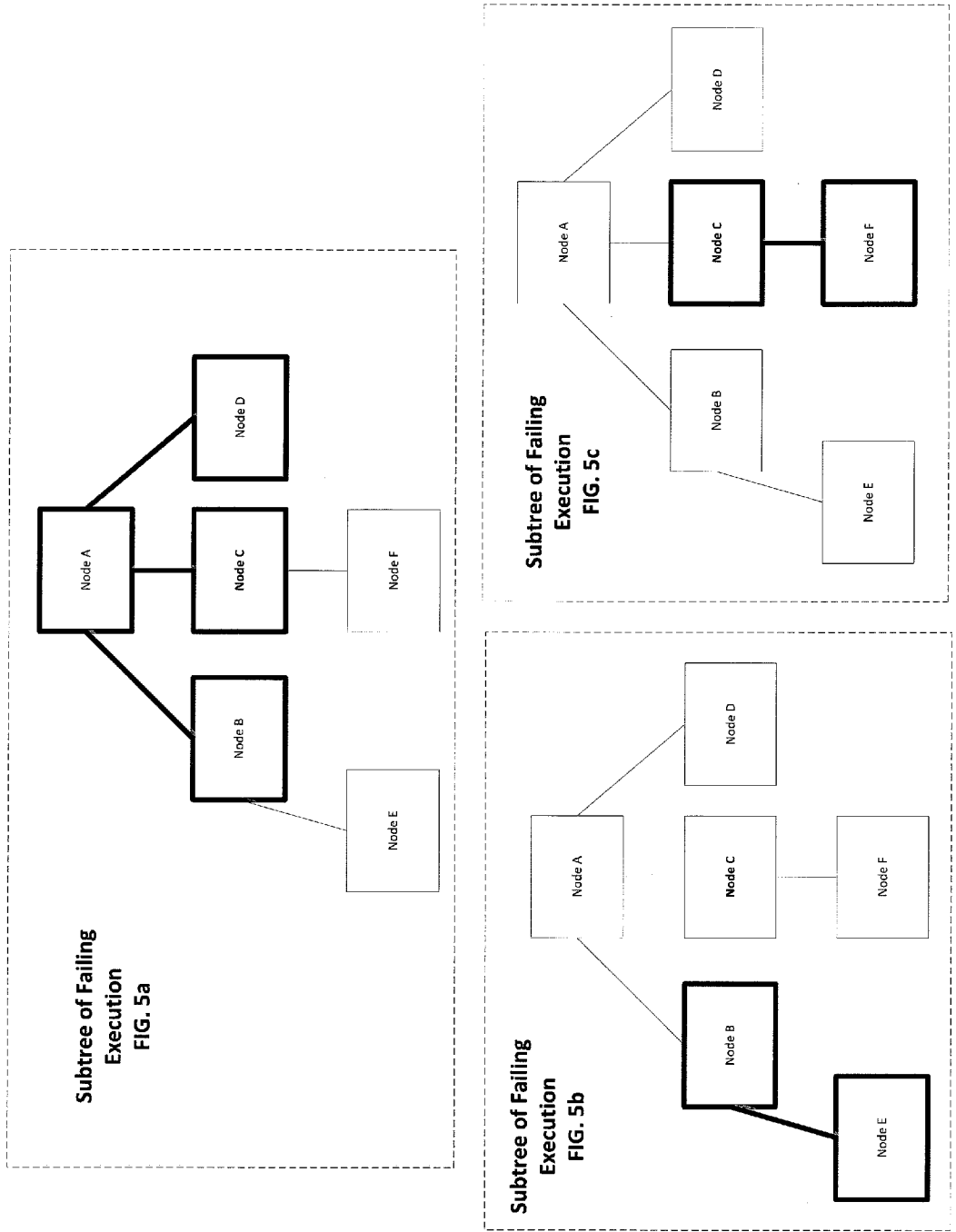

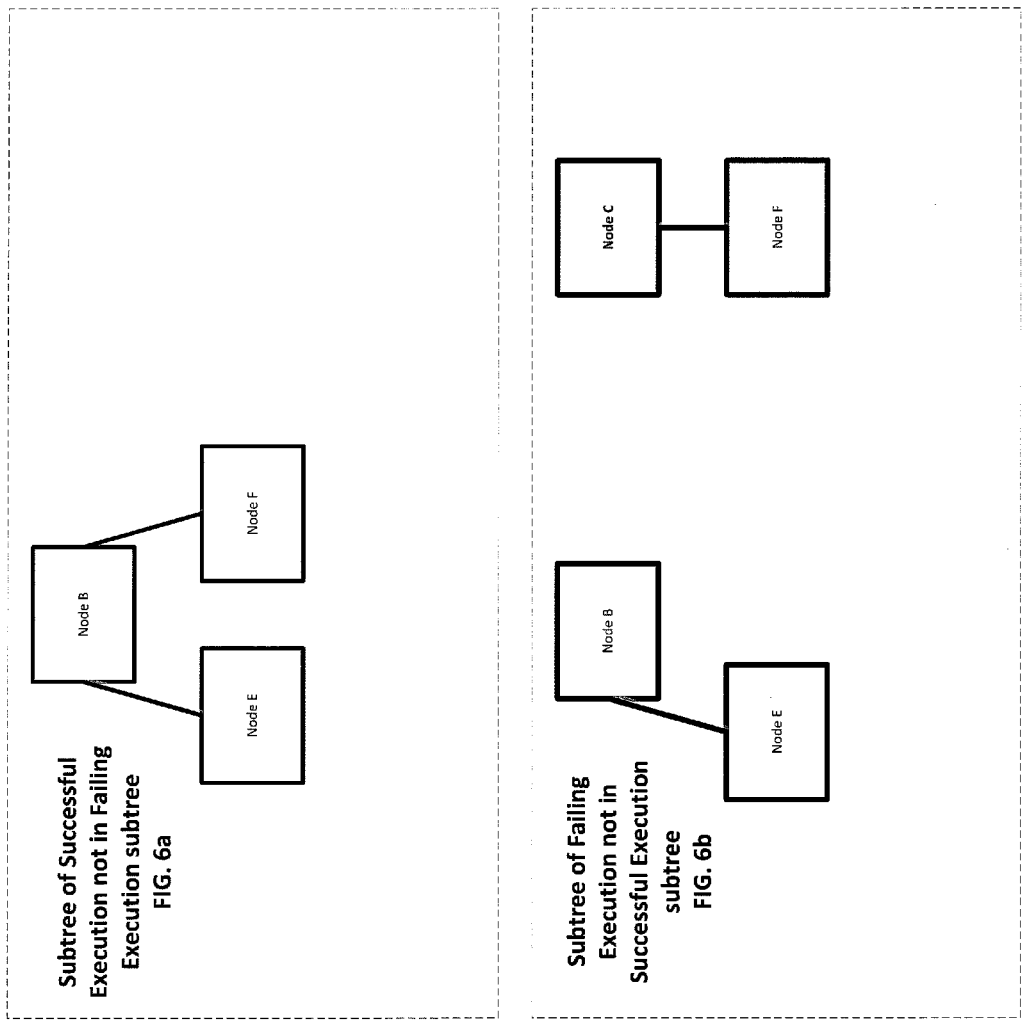

SYSTEM TO UNCOVER ROOT CAUSE OF NON-DETERMINISTIC (FLAKY) TESTS

BACKGROUND

Software developers often use tests to validate the functionality of their source code when changes have been made to the codebase and prior to deploying the code to production. If the tests pass, developers may assume that their code is working correctly and if the tests fail, developers may determine that the source code has bugs or other problems that need to be fixed. However, some tests may be non-deterministic, meaning that there are times when the tests pass and times when the tests fail without any changes to the source code.

Non-deterministic tests may have several causes. For instance, some tests are written based on wrong assumptions about their behaviors such as assuming fixed execution time for a certain task. Other tests have unexpected resource sharing with other programs, such as network, file system and memory. Additionally, some tests contain concurrency bugs themselves. Non-determinism in software tests is a major impediment to effectively improving and evolving a codebase, especially as the codebase grows very large. These non-deterministic, flaky, tests can cause multiple problems including providing false success results when new code has a subtle non-deterministic bug or causing flaky libraries' client applications to be unpredictable. Due to flakiness, it is difficult to reproduce the incorrect behavior and pinpoint the behavior's cause within source code. Therefore, as recognized by the inventors, there should be a tool to help developers effectively and efficiently determine the root cause of non-deterministic tests.

SUMMARY

This specification describes technologies related to software testing in general, and specifically to methods and systems for uncovering the root cause of non-deterministic software behaviors.

In general, one aspect of the subject matter described in this specification can be embodied in a system and method for determining the root cause of non-deterministic tests. An example system may include one or more processing devices and one or more storage devices storing instructions that, when executed by the one or more processing devices, cause the one or more processing devices to execute an example method. An example method may include: receiving a test that has been identified as non-deterministic; running the test, enabling call trace collection to record call traces from the test until at least one execution has succeeded and one execution has failed; for each trace in the call trace collection, determining whether the trace was part of a passing test or a failing test and labeling the trace according to the determination; constructing a dynamic call tree for the passing traces; constructing a dynamic call tree for the failing traces; comparing the dynamic call tree for the passing traces with the dynamic call tree for the failing traces to determine the subtree patterns that only occur in one tree or the other; and ranking the subtree patterns based on the number of hits in the traces to determine the root cause of the non-deterministic test.

These and other embodiments can optionally include one or more of the following features: generated classes may be renamed consistently across multiple test runs so that generated classes may be compared; class initialization may be factored out from the test runs to reduce the noise from non-deterministic class loading; non-deterministic class loading may be executed separately from the rest of the non-deterministic test in order to determine whether the non-deterministic test is flaky because of class initialization order; and subtree patterns may be mapped to the collected call trace and the overlapping subtree may be merged.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 2 is an example of a non-deterministic test.

FIG. 4a is an example subtree of the call tree of FIG. 3a representing a successful execution of a non-deterministic test.

FIG. 4b is an example subtree of the call tree of FIG. 3a representing a successful execution of a non-deterministic test.

FIG. 5a is an example subtree of the call tree of FIG. 3b representing a failing execution of a non-deterministic test.

FIG. 5b is an example subtree of the call tree of FIG. 3b representing a failing execution of a non-deterministic test.

FIG. 5c is an example subtree of the call tree of FIG. 3b representing a failing execution of a non-deterministic test.

FIG. 6a is an example of subtrees of the call tree of FIG. 3a representing a successful execution of a non-deterministic test that are not in the call tree of FIG. 3b representing a failing execution of the non-deterministic test.

FIG. 6b is an example of subtrees of the call tree of FIG. 3b representing a failing execution of a non-deterministic test that are not in the call tree of FIG. 3a representing a successful execution of the non-deterministic test.

DETAILED DESCRIPTION

Figure 1:
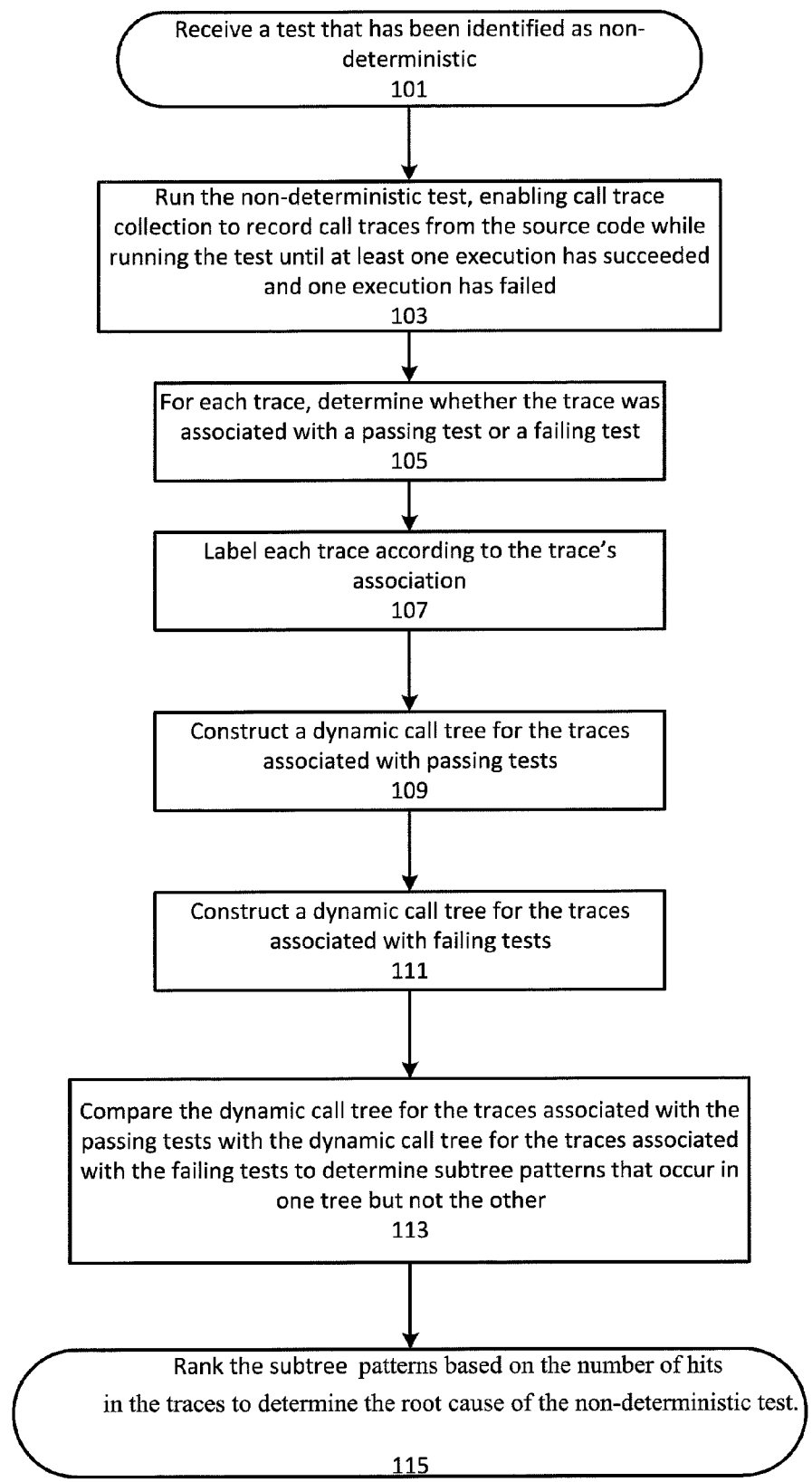
FIG. 1 is a flow diagram of an exemplary method for determining the root cause of non-deterministic tests.

According to an exemplary embodiment, as shown in FIG. 1, an exemplary system may receive non-deterministic or flaky tests, and run the tests with call trace collection enabled. A test is identified as non-deterministic if some of its runs execute successfully while the others end up with failure without any change to the code. An exemplary test, as shown in FIG. 2 and written in pseudo code, verifies a condition to assign a task to a scheduler, schedule the task, and then check whether the task has been executed.

Call trace collection may be performed several different ways. In an exemplary embodiment, while a test is running, all function/method call histories may be sequentially recorded as (call depth, methodId). For instance, when at a call depth (or stack depth) of 10, method A calls method B first, method C, and then method D, pairs (10, A), (11, B), (11, C), and (11, D) may be recorded accordingly. All the call records together may construct a call trace and may be saved to a log file per thread. This call trace collection may be implemented through interpreter/compiler instrumentation or byte code rewriting. Alternatively, call relations may be sequentially recorded as method pairs (callerId, calleeId). For example, when method A calls B first, C next, and then D, pairs (A, B), (A, C), (A, D) are recorded accordingly. All the method pairs together construct a call trace and are saved to a log file.

For each execution of the test, the corresponding trace log file is labeled with either a "PASS" or "FAIL" to reflect the execution status. The test may be run at least enough times to receive one pass execution and one fail execution. More traces may produce better results. For each trace log file, an exemplary system constructs a dynamic call tree.

A dynamic call tree is an ordered tree where each node is a method and child nodes are actual call sequence from the method in the order of activation. For example, an edge going from node A to node B indicates that the procedure represented by node A calls the procedure represented by node B.

Figure 3A:
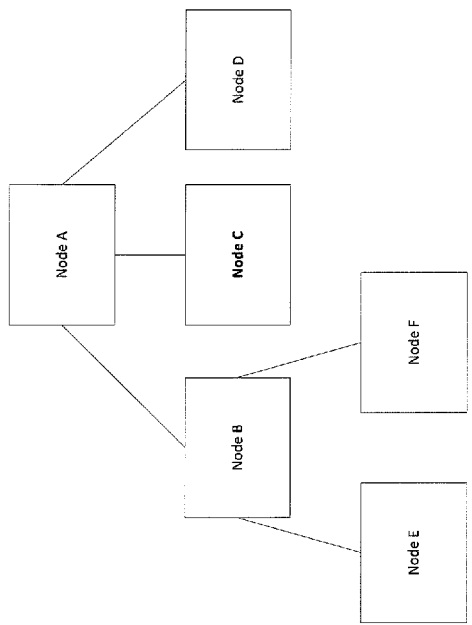
FIG. 3a is an example call tree for a successful execution of a non-deterministic test.
Figure 3B:
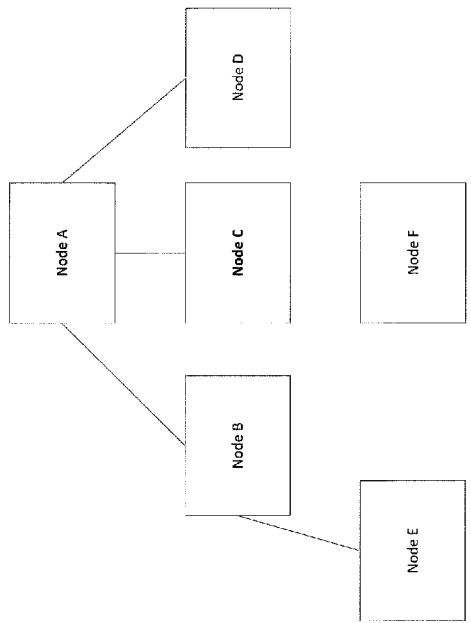
FIG. 3b is an example call tree for a failing execution of a non-deterministic test.

FIGS. 3a and 3b represent examples of call trees for the execution of a non-deterministic test. FIG. 3a illustrates a successful run of the test while FIG. 3b illustrates a failing run of the same test. These two trees have slightly different call traces, which indicate root cause of the non-determinism.

An exemplary system splits each tree into a set of smaller trees by truncating the whole tree into subtrees. In an exemplary embodiment, subtrees may be truncated by capturing subtrees to a depth of d. If there is a loop in the subtree at depth d, the subtree may be split at the back edge of the loop. The back edge may be obtained from the source code using static analysis. This method for truncating subtrees is only an example and any algorithm to capture subpatterns may work within an exemplary system.

Each subtree partially represents some call relations demonstrated in the overall trace. By comparing the subtree sets derived from PASS traces and those from FAIL traces, an exemplary system determines the subtree patterns unique to each set (113). FIGS. 4a and 4b illustrate subtrees of the successful execution shown in FIG. 3a. FIGS. 5a-5c illustrate subtrees of the failing execution shown in FIG. 3b. By comparing the two sets, we find differences in the methods called by method B.

The exemplary system may then report patterns that only happen in PASS traces and subpatterns that only happen in FAIL traces. In some embodiments, the exemplary system may rank the diverging subtree patterns between the two sets based on the frequency of each pattern. The higher a pattern is ranked, the more likely it is to be a root cause of the non-deterministic test.

In some scenarios, source code contains some dynamically generated functions or classes at runtime. Each of such dynamically generated entity may contain the same code across different runs, but gets assigned different identity names. In order to get the actual difference between different traces ignoring such innocuous distinction, we take advantage of the naming convention for generated entities and map entities accordingly. For instance, an exemplary system maps class name CLASS_RUNA and CLASS_RUNB together based on their same prefix and aligns two traces on top of that.

In other scenarios, an exemplary system separates call traces relevant to class initialization from others in order to isolate effects caused by non-deterministic class loading. Then the call traces relevant to class initialization are analyzed separately to decide whether a different class loading order is the root cause for non-determinism. Using the class-initialization for the root causing analysis is optional. This is because many root causes are not related to the class-initialization, and this can be turned on only when the user may think it is relevant.

An exemplary system may also map subtree patterns to the collected call traces and merge the overlapping subtrees. If trees differ at a high level, the differences in the lower levels may be merged (or hidden) so an end user is not confused. Since an exemplary system may base its comparison on subtree patterns, several subtree patterns may actually overlap on the real tree. For example, the tree represented in FIG. 3a may be written as (A (B (E F) C D) in parentheses notation. The tree in FIG. 3b may be written as (A B (E) C (F) D). For every opening parenthesis, the tree descends one level and for every closing parenthesis, the tree ascends one level. If the tree in FIG. 3b was (A B (E) X (F) D) instead of (A B (E) C (F) D), with method X replacing method C, then the patterns at the very top of the trees of FIGS. 3a and 3b already differ. At the top level FIG. 3a is (A (B C D) and revised FIG. 3b is (A (B X D). Although there are also differences at the lower levels of the two trees, the lower-level differences are continuations of the differences at the top level. Therefore, an exemplary system combines these differences into a single pattern to display to the end user. Without combining the differences, the end user may assume that there are multiple differences when, in fact, there is one difference.

Figure 7:
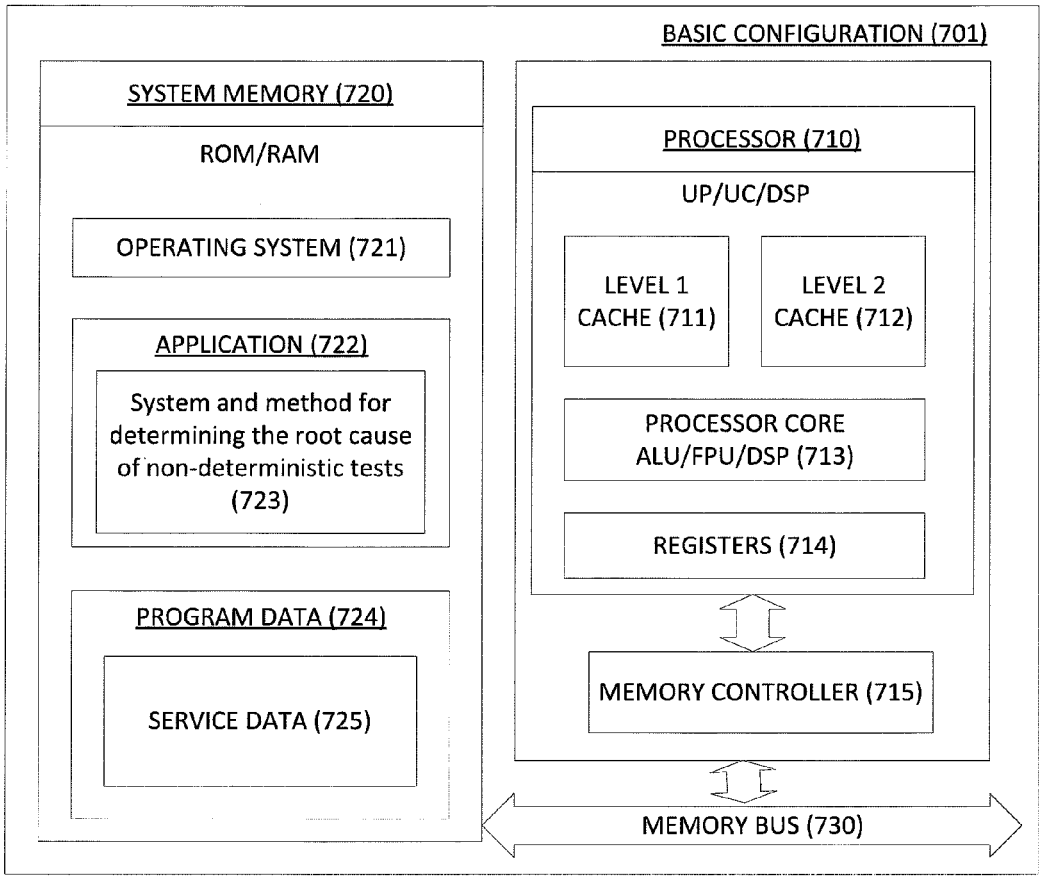
FIG. 7 is a block diagram illustrating an exemplary computing device.

FIG. 7 is a high-level block diagram to show an application on a computing device (700). The application determines the root cause of flaky tests. In a basic configuration (701), the computing device (700) typically includes one or more processors (710), system memory (720), and a memory bus (730). The memory bus is used to do communication between processors and system memory.

Depending on different configurations, the processor (710) can be a microprocessor (µP), a microcontroller (µC), a digital signal processor (DSP), or any combination thereof. The processor (710) can include one or more levels of caching, such as a L1 cache (711) and a L2 cache (712), a processor core (713), and registers (714). The processor core (713) can include an arithmetic logic unit (ALU), a floating point unit (FPU), a digital signal processing core (DSP Core), or any combination thereof. A memory controller (716) can either be an independent part or an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more applications (722), and program data (724). The application (722) may include a system and method for determining the root cause of non-deterministic tests. Program Data (724) includes storing instructions that, when executed by the one or more processing devices, implement a system and method for determining the root cause of non-deterministic tests. (723). In some embodiments, the application (722) can be arranged to operate with program data (724) on an operating system (721).

The computing device (700) can have additional features or functionality, and additional interfaces to facilitate communications between the basic configuration (701) and any required devices and interfaces.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that includes any of the above functions. The computing device (700) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for determining the root cause of non-deterministic tests, the system comprising:
one or more processing devices and
one or more storage devices storing instructions that, when executed by the one or more processing devices, cause the one or more processing devices to:
receive a test that has been identified as non-deterministic;
run the test, enabling call trace collection to record call traces from the test until at least one execution has succeeded and one execution has failed;
for each trace in the call trace collection,
determine whether the trace was part of a passing test or a failing test and
label the trace according to the determination;
construct a dynamic call tree for the passing traces;
construct a dynamic call tree for the failing traces;
compare the dynamic call tree for the passing traces with the dynamic call tree for the failing traces to determine the subtree patterns that only occur in one tree or the other;
rank the subtree patterns based on the number of hits in the traces to determine the root cause of the non-deterministic test; and
map the subtree patterns to the collected call traces and merge overlapping subtrees.

2. The system of claim 1, further comprising renaming generated classes consistently across multiple test runs so that generated classes may be compared.

3. The system of claim 1, further comprising factoring out class initialization from the test runs to reduce noise from non-deterministic class loading.

4. The system of claim 3, further comprising executing non-deterministic class loading separately from the rest of the non-deterministic test in order to determine whether the non-deterministic test has a different outcome per test run because of class initialization order.

5. A method for determining the root cause of non-deterministic tests, the method comprising:
receiving a test that has been identified as non-deterministic;
running the test, enabling call trace collection to record call traces from the test until at least one execution has succeeded and one execution has failed;
for each trace in the call trace collection,
determining whether the trace was part of a passing test or a failing test and
labeling the trace according to the determination;
constructing a dynamic call tree for the passing traces;
constructing a dynamic call tree for the failing traces;
comparing the dynamic call tree for the passing traces with the dynamic call tree for the failing traces to determine the subtree patterns that only occur in one tree or the other;
ranking the subtree patterns based on the number of hits in the traces to determine the root cause of the non-deterministic test;
mapping the subtree patterns to the collected call traces and merging overlapping subtrees.

6. The method of claim 5, further comprising renaming generated classes consistently across multiple test runs so that generated classes may be compared.

7. The method of claim 5, further comprising factoring out class initialization from the test runs to reduce noise from non-deterministic class loading.

8. The method of claim 7, further comprising executing non-deterministic class loading separately from the rest of non-deterministic test in order to determine whether the non-deterministic test has a different outcome per test run because of class initialization order.

9. A non-transitory computer-readable medium having stored therein computer executable code that causes one or more processors to execute the steps of:
- receiving a test that has been identified as non-deterministic;
- running the test, enabling call trace collection to record call traces from the test until at least one execution has succeeded and one execution has failed;
- for each trace in the call trace collection,
  - determining whether the trace was part of a passing test or a failing test and
  - labeling the trace according to the determination;
- constructing a dynamic call tree for the passing traces;
- constructing a dynamic call tree for the failing traces;
- comparing the dynamic call tree for the passing traces with the dynamic call tree for the failing traces to determine the subtree patterns that only occur in one tree or the other;
- ranking the subtree patterns based on the number of hits in the traces to determine the root cause of the non-deterministic test; and
- mapping the subtree patterns to the collected call traces and merging overlapping subtrees.

10. The computer-readable medium of claim 9, further comprising renaming generated classes consistently across multiple test runs so that generated classes may be compared.

11. The computer-readable medium of claim 9, further comprising factoring out class initialization from the test runs to reduce noise from non-deterministic class loading.

12. The computer-readable medium of claim 11, further comprising executing non-deterministic class loading separately from the rest of the non-deterministic test in order to determine whether the non-deterministic test has a different outcome per test run because of class initialization order.

* * * * *